US012494332B2

(12) United States Patent
Cheng

(10) Patent No.: US 12,494,332 B2
(45) Date of Patent: Dec. 9, 2025

(54) CONTACTOR AND GENERAL SWITCHING DEVICE COMPRISED THEREOF

(71) Applicant: Yu Ching Cheng, Lantau (HK)

(72) Inventor: Yu Ching Cheng, Lantau (HK)

(73) Assignee: Yu Ching Cheng, Hong Kong (CN)

( * ) Notice: Subject to any disclaimer, the term of this patent is extended or adjusted under 35 U.S.C. 154(b) by 0 days.

(21) Appl. No.: 18/290,752

(22) PCT Filed: Sep. 20, 2022

(86) PCT No.: PCT/IB2022/058797
§ 371 (c)(1),
(2) Date: Jan. 19, 2024

(87) PCT Pub. No.: WO2023/042163
PCT Pub. Date: Mar. 23, 2023

(65) Prior Publication Data

US 2025/0104943 A1 Mar. 27, 2025

(30) Foreign Application Priority Data

Sep. 20, 2021 (WO) .................. PCT/IB2021/058532

(51) Int. Cl.
*H01H 33/04* (2006.01)
*H01H 33/59* (2006.01)

(52) U.S. Cl.
CPC ............ *H01H 33/04* (2013.01); *H01H 33/59* (2013.01)

(58) Field of Classification Search
CPC ............................... H01H 33/04; H01H 33/59
USPC ........................................................ 307/140
See application file for complete search history.

(56) References Cited

U.S. PATENT DOCUMENTS 6,814,632 B1 11/2004 Peterson

FOREIGN PATENT DOCUMENTS

| | | |
|---|---|---|
| CN | 2384806 Y | 6/2000 |
| CN | 103456566 A | 12/2013 |
| CN | 207052801 U | 2/2018 |
| CN | 106683947 B | 11/2020 |
| JP | 56004138 U | 1/1981 |

*Primary Examiner* — Richard Tan
(74) *Attorney, Agent, or Firm* — Muncy Geissler Olds

(57) ABSTRACT

A contactor includes an enclosed space containing an arc extinguishing medium or a vacuum, separated into two chambers by a movable contact head connected with hollow contact units enabling the two chambers to communicate; at least one of the chambers is provided with a static contact head connected with contact units; the movable contact head implements reciprocal movement, the contact units of the movable contact head are engaged with and disengaged from the contact units of the static contact head, and the two chambers are alternately compressed and expanded, wherein the arc extinguishing medium flows back and forth at arc gaps between the movable contact head and the static contact head through the hollow contact units and circulates between the two chambers, providing a contactor and a self-circulating reciprocal synchronous arc extinguishing pump thereof, to turn ON, turn OFF of the contactor and implement a synchronous arc extinguishing.

11 Claims, 10 Drawing Sheets

CONTACTOR AND GENERAL SWITCHING DEVICE COMPRISED THEREOF

FIELD OF THE DISCLOSURE

The present disclosure relates to a contactor, particularly, the present disclosure relates to a contactor device having an arc extinguishing pump.

BACKGROUND OF THE DISCLOSURE

A contactor is a switching device in which the power supply electric terminal and the load electric terminal are electrically connected through the contacts of their respective internal electrical contact points. There is a demand for a systematic and automatic management for smart electric grid, grid-connected power generation and distributed contactor devices at various nodes such as cities, industries and community power supply entrances, electricity substation, etc., involving large capacity, stability and predicable warning maintenance; due to the frequent switching operation the power switches with electric locomotives, large electromagnetic power apparatus, power storages for industries and homes, electric vehicle power battery, green energy power generation operation and extreme environment application (such as aerospace, underwater power system), require highly on power density, safety, arc resistance, durability, lifespan, and controllability.

However, contactors currently in use have a small number of contact points and therefore relatively high contact resistance; touch contact can easily lead to deformation, displacement and wearing off of the contact points; electric arc and high contact point resistance lead to irreversible aging of the contact points, the atmospheric environment causes the contact points to be stained and oxidized; the single bellow chamber of contact heads is likely to cause leakage due to high pressure fluctuation, and the sealing of the chamber increases the movement resistance of the movable contact head, which limits the movement of the movable contact head and increases its dynamic and static power consumption; the problem of electric arcs caused by the contact and separation of contact points is yet to be effectively solved; the collection and accumulation of various factors further lead to the gradual aging or damage of the contact points, and may lead to accidents such as welding and burning without warning, resulting in multiple related damages to the load and power receivers at huge costs; electric arc can ignite accidentally released flammable gases; pneumatic and electromagnetic driving devices of the contactor and its arc extinguishing mechanism result in bulky and complicated contactors; problems such as manual restoration of switch position, high noise, high power consumption, electromagnetic interference generated by the electromagnetic driving device and possible mis-operation caused by electromagnetic impact are to be resolved.

SUMMARY OF THE DISCLOSURE

The contactor of the present disclosure comprises a self-circulating reciprocal synchronous arc extinguishing pump, performing targeted synchronous arc extinguishing against the arc gap of the contactor to effectively protect the contact points of the contactor from electric arc damage; contact units of the contactor contact by way of receiving and lateral sliding to avoid the mechanical collision, noise and bouncing of contact points caused by the touch contact in the prior art; the contactor maintains contacted by the horizontal elasticity of the tip ends of the contact units, negate the need of power consumption to maintain contacting; in the contactor, the contact units is divided into multiple contact tip ends. Each contact tip end forms several contact points, forming a multi-contact points and low-resistance contact interface. If the contactor is provided with contact units distributed in an array, the number of contact points will be quite considerable, which will significantly reduce the power consumption of the contactor, increase its power density and slow down the aging of the contactor due to the long-term electro-thermal effect, especially in an oxygen-free, pollution-free enclosed space, thereby it will significantly prolong the lifespan of the contactor. Moreover, the contact units distributed in an array provide an electric arc gap interface, the electric arc may either occur in all of the arc gaps, or a small number of electric arcs may move among the arc gaps, with the former dispersing the electric arc, and the latter having a short duration of arc influence on a single contact unit to avoid the high temperature and concentrated electric arc in the single one of contact units which commonly occur at fewer contact units to cause damages in the prior art. Furthermore, every one of the arc gaps is targetedly flushed by the liquid arc extinguishing medium or blown into by the gas arc extinguishing medium, so that the electric arc will be quickly extinguished or will never be formed. The contactor of the present disclosure is further embedded with a microprocessor module, a motion control system and a contactor monitoring and warning system. The microprocessor module also performs automatic and smart controls of the contactor. In addition to performing automatic switching operation, the motion control system further improves the arc extinguishing effect and the protection of the contact points by the contacting way under controls. The contactor monitoring and warning system will issue different warnings before the failure of the contactor occurs, so that the contactor can obtain sufficient service time, and avoid failures without warning.

A contactor of the present disclosure, comprising an enclosed space with its interior containing a liquid or a gas arc extinguishing medium or being configured as a vacuum, a movable contact head separates the enclosed space into two chambers, wherein at least one of the chambers is provided with a static contact head, one or more contact units of the static contact head align one-to-one with one or more contact units of the movable contact head, paired to each other with an arc gap; the contact units of the movable contact head are hollow enabling the two chambers to communicate the arc extinguishing medium; the movable contact head reciprocates, the contact units of the movable contact head are receivably engaged with and disengaged from the contact units of the static contact head to turn on and off the contactor, at the same time, the two chambers are alternately compressed and expanded, wherein the arc extinguishing medium rushes into the arc gaps, flows back and forth through the hollow of the contact units of the movable contact head, and circulates between the two chambers, therefore a contactor and its self-circulating reciprocal synchronous arc extinguishing pump is provided to implement turning ON, OFF of the contactor and synchronous arc extinguishing thereof.

A movable contact head movement frame, comprising a movable contact head sleeve with its outer wall extending to form at least two bearing bases, linear bearings and bearing tracks; two ends of the bearing tracks are fixed at corners of a first and a second fixing plates which are in parallel, together with other fixing and support members, a two layers rigid frame is formed; the static contact head is fixed at the first fixing plate, a metallic elastic bellow having a first opening is arranged at the static contact head, and a second opening of the first bellow is arranged at the movable contact head; the movable contact head sleeve is arranged at a second opening of the first bellow, the movable contact head and a first opening of a second bellow; a second opening of the second bellow is fixed at the second fixing plate, or is arranged at a second static contact head and then fixed at the second fixing plate; the movable contact head sleeve performs reciprocal movement along the bearing tracks between the two fixing plates under an external force, the contact units of the movable contact head are engaged with and disengaged from the contact units of the static contact head, the two bellows alternately extend and retract, therein the arc extinguishing medium circulates between the two bellows, and flows back and forth at the arc gaps between the contact units of the movable contact head and contact units of the static contact head through the hollow of the contact units of the movable contact head, to take away electric arc and heat thereof, to provide a double bellows self-circulating reciprocal synchronous arc extinguishing pump contactor. The movable contact head sleeve is directly or through other structures driven by an acting force generated by manpower, spring force, pneumatic, hydraulic, electromagnetic operating devices and other actuating devices to drive the movable contact head to perform one-way or reciprocal movement to implement turning ON or/and OFF of the contactor; alternatively, the movable contact head can be fixed, and the force is applied to other portion of the contactor except the movable contact head, so that the static contact head performs the one-way or reciprocal movement relative to the movable contact head to implement the turning ON or/and OFF of the contactor.

The static contact head comprises: a connection substrate enclosed in a static contact head insulator, or further extended outwardly to form an electric terminal, and one or an array of contact units of the static contact head; a first ends of the contact units of the static contact head connects with the connection substrate, and a second ends of the contact units of the static contact head, that is, a contact end, protrudes from a surface of the insulator; the movable contact head comprises: a connection substrate enclosed in a movable contact head insulator, or further extended outwardly to form an electric terminal, and one or an array of contact units of the movable contact head penetrating through the connection substrate, a first ends of the contact units of the movable contact heads open at a first surface of the insulator, and with a second ends of contact units of the movable contact head, that is, a contact end, protruding from a second surface of the insulator and one-to-one equidistantly paired with the contact ends of the static contact head; the contact units of movable contact head may be provided with dual contact ends protruding from both surfaces of the insulator. The contact end of the contact units of the static contact head are divided into multiple contact tip ends by longitudinal notches, the contact end of the contact units of the movable contact head are divided into multiple contact tip ends by longitudinal slitted cuts, an inner opening of the contact ends of the contact units of the movable contact head may be provided with a deep and a shallow two-layered narrow sections, and the cuts and the notches are engaged alternately with each other, so that one contact tip end obtains multiple contact points, and number of the contact points formed by one contact end is several times of the number of the contact tip ends, to provide a multi-contact points, low-resistance contact interface. The contact unit of the movable contact head is an electrical insertion tube, the contact unit of the static contact head is an electrical insertion pin, the contact end in the electrical insertion tube is equally divided into several tile-shaped contact tip ends by slitted cuts, the contact end in the electrical insertion pin is equally divided into several finger-shaped contact tip ends by wider notches, both having the same number of contact tip ends, the inner opening of the contact ends of the electrical insertion tube may be provided with the two-layered annular narrow sections, wherein the slitted cuts and the notches are orthogonally and alternatively engaged with each other to implement a connection of the movable contact head to the static contact head, number of contact points obtained is at least twice or four times the number of the finger-shaped or tile-shaped tip ends; the contact units can also be of non-circular structure, contacted longitudinally engaged to laterally slide to each other to a completion of contact, and maintained in contact with horizontal elasticity of the contact tip ends. Since the contact units and connection substrates are arranged in an oxygen-free, clean and sealed environment, in addition to commonly used metals, materials of the contact units and connection substrates can also be easily obtained and processed metals such as iron, aluminum, and the contact units and the connection substrates can be made of one or more of the metals formed by mixing or layering.

The present disclosure also provides a piston-type movable contactor head contactor, comprising: an airtight cylinder-type housing, having an interior filled with an arc extinguishing medium or being configured as vacuum, and an inner wall with a longitudinally protruding sliding track; a static contact head, comprising: the connection substrates and electric terminals thereof, and an array of contact units, the connection substrates are enclosed in one end of the cylinder housing; a piston-type movable contact head, movably fitting to the inner wall, separates the interior of the housing into two chambers and encloses with a connection substrate, the connection substrate is connected with an array of the contact units with two ends being opened for a communication of the chambers, the contact units are equidistantly opposite to the contact units of the static contact head, and the movable contact head is provided with a piston center thread; and an actuating device fixed at a second end of the housing, driving the contact units of the movable contact head to engage with and disengage from the contact units of the static contact head, providing a relay contactor and a cylinder piston type arc extinguishing pump.

The contactor also comprises a controller, comprising: a microprocessor, a communication module, sensors, an actuating device and a power module; wherein the microprocessor, the sensors and the actuating device provide a motion control system for performing motion control on the movable contact head, implementing segmented speed controls, precise positing and mechanical locking on the process for the contact units of the movable contact head to receivably engage with and disengage from the contact units of the static contact head; the microprocessor, the communication module and the sensors provide a contactor monitoring and warning system for monitoring the contactor, transferring data and alerts to an external and a remote terminal, indicating a contactor fault warning for a maintenance and replacement of the contactor, and receiving from the external and remote terminal instructions and data, including instructions for turning ON and OFF the contactor; the power module provides power conversion for powering the controller, and may further comprises a rechargeable battery to be activated when the controller power supply is cut off. The controller can further be replaced by a simplified circuit having an analog, logic circuit and a motor drive chip, or a monolithic IC integrating the simplified circuit for miniature contactors such as relay contactors to implement simple ON/OFF control.

The motion control system provides motion controls to turn on and off the contactor, comprising: turning on the contactor: the movable contact head releases from the mechanical lock, and moves at a rated second fast speed from an OFF position of the contactor towards the static contact head, when an electric arc or an electric arc critical position signal occurs, the movable contact head moves at a first speed in a high speed or increasing speed towards the static contact head; when the contact units of the movable contact head contact the contact units of the static contact head, the movable contact head immediately moves at a slowest third speed, until completion of turning on the contactor and the movable contact head at a precise position, the movable contact head stops to be locked; wherein, the electric arc critical position is generally obtained from theory and determined from experiment, the movable contact head starts an electric arc from this position to the static contact head; and turning off of the contactor: the movable contact head is unlocked at the turning on position of the contactor, the movable contact head moves reversely at the first speed in a high speed, moves reversely at the second speed when the electric arc disappears or the electric arc critical position signal occurs, and stops to be locked when the movable contact head position signal occurs at a completion of the turning off the contactor. The controller further provides one or more methods for automatic turning on and off of the contactor, comprising: a time control method for setting a timed trigger of the microprocessor chip, and performing a timed ON and OFF of the contactor in an interrupt mode; and a parameter trigger method, the sensor data exceeds a set values or a range to trigger the turning ON and OFF of a contactor, such as a performance of a circuit breaker.

The present disclosure also provides a general automatic and smart switch technology, by selecting structures of different sizes and specifications to change stroke span of the movable contact head, connection substrate spacing and the contact end spacing distance, to comply with the voltage type (AC or DC) and the rated voltage for specific applications, solving a problem with the upper limit of a rated voltage of a contactor; and selecting different numbers of the contact ends of the movable contact head/static contact head and their corresponding supporting systems, to comply with the rated operating current and power level required in specific applications, solving a problem with the upper limit of a rated current of a contactor; therefore the technology provides general automatic switching devices with various specifications, rated voltages and rated operating currents, including contactors, breakers, relays and logic power switches.

DETAILED DESCRIPTION

The present disclosure relates to a contactor. FIGS. 1 to 5 are the overall oblique view, the internal open view, the sectional view along the central axis of the movable contact head and the static contact head, the electrical structure and the exploded view of some embodiments of the contactor.

Figure 1:
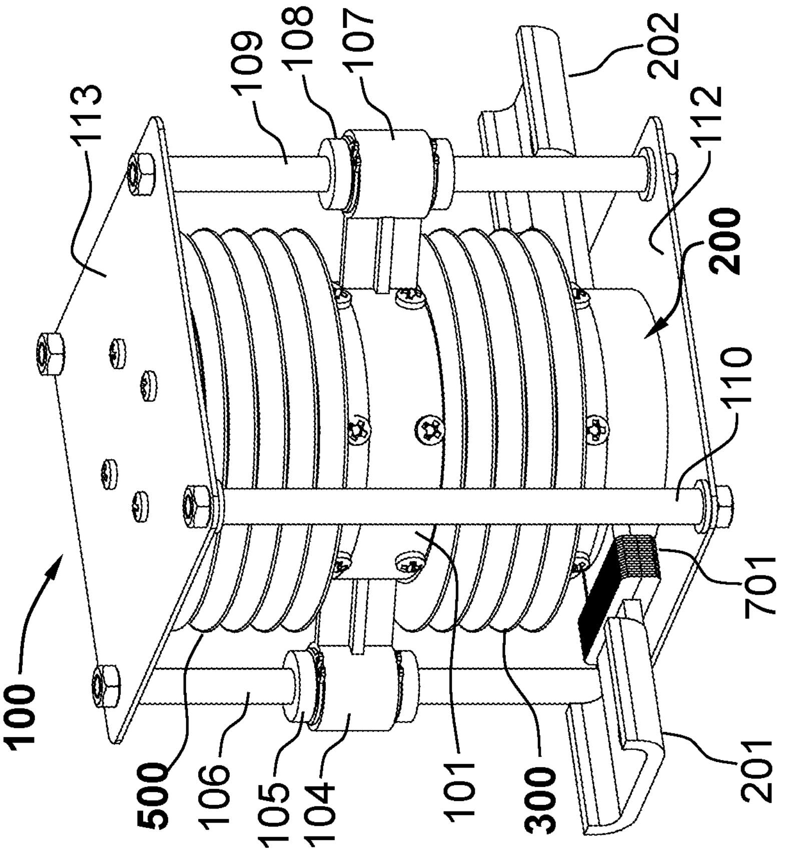
FIG. 1 is an oblique view of the contactor according to one or some embodiments of the present disclosure.

FIG. 1 shows an oblique view of a contactor of some embodiments. The contactor comprises a movable contact head movement frame 100, a static contact head 200, a first bellow 300, a movable contact head 400 (not shown, refer to FIG. 5) and a second bellow 500.

The movable contact head movement frame 100 comprises: a movable contact head sleeve 101, a beam 102, a thread 103 (not shown, refer to FIG. 5), a first bearing base 104, a first linear bearing 105, a first bearing track 106, a second bearing base 107, a second linear bearing 108, a second bearing track 109, a first fixing plate support rod 110, a second fixing plate support rod 111 (not shown, refer to FIG. 5), a first fixing plate 112 and a second fixing plate 113. The static contact head 200 is provided with a first electric terminal 201 and a second electric terminal 202, the first electric terminal 201 is provided with a transformer type current sensor 701 for measuring current flowing through the first electric terminal 201. The two ends of the first and the second bearing tracks 106, 109 and the first and the second fixing plate support rods 110, 111 are fixed at four corners of the first and the second fixing plates 112, 113, to form a rigid two-layer frame. The fixing plate support rods can be replaced by other structural members. The bearing tracks can also be provided in an interior of the contactor.

Figure 2:
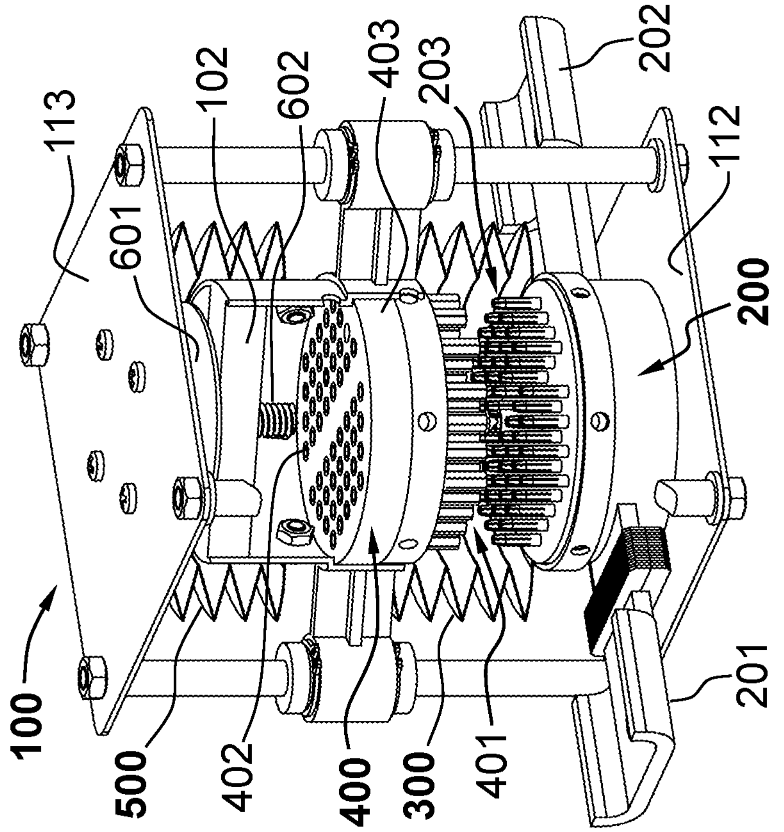
FIG. 2 is a open interior of the contactor of FIG. 1.

FIG. 2 is an internal open view of some embodiments of the contactor showing the static contact head 200 and its contact units of an array of electrical insertion pins 203, and the movable contact head 400 and its contact units of an array of electrical insertion tubes 401. The static contact head 200 is fixed at the first fixing plate 112, and is arranged at a first opening (not shown, refer to FIG. 5) of the first bellow 300. The movable contact head sleeve 101 is arranged at a second opening (not shown, refer to FIG. 5) of the first bellow 300, the movable contact head 400 and a first opening of the second bellow 500. A second opening (not shown, refer to FIG. 5) of the second bellow is fixed at the second fixing plate 113 to form a coaxial structure with the interior isolated from the atmosphere, which can withstand the internal filling of the arc extinguishing medium and the pressure change caused by temperature changes and movement of the movable contact head 400. Inside the first bellow 300, the contact ends of the electrical insertion tubes 401 and the contact ends of the electrical insertion pin 203 are one-to-one co-axial and equidistantly opposite to each other, forming arc gaps. A tube opening 402 of electrical insertion tubes 401 is opened through a surface of the movable contact head insulator 403, so that the first bellow 300 communicates with the second bellow 500. The interior can be optionally configured as vacuum. The electrical insertion tubes/electrical insertion pins and their connection substrate (refer to FIG. 3) are always in a stable, clean environment and in an enclosed state, so common materials such as copper can be used, and low-cost metals such as aluminum, iron, etc. can also be used.

A geared motor 601 engages a thread 103 (not shown, refer to FIG. 5) on the beam 102 of the movable contact head sleeve 101 through a leadscrew 602, to drive the movable contact head sleeve 101 and the movable contact head 400 moving towards the static contact head 200, the first bellow 300 compresses and the second bellow 500 extends, the arc extinguishing medium (not shown) in the first bellow 300 flows into the second bellow through the electrical insertion tubes 401 and their tube openings 402, and performs a direct cooling and transfer of the high temperature electric arc particles in the arc gaps between the contact ends of the electric insertion tubes 401 and the electric insertion pins 203, implement synchronous arc extinguishing, until the arc gaps disappeared, the electrical insertion tubes 401 engaged with the electrical insertion pins 203 to a set depth is completed, wherein the first electric terminal 201 and the second electric terminal 202 are electrically connected, and the contactor is on. The geared motor rotates in a reverse direction, the movable contact head 400 disengages from the static contact head, the first bellow 300 extends and the second bellows 500 compresses, the arc extinguishing medium flows in a reverse direction for performing synchronous arc extinguishing at the arc gaps reappeared, until the contactor off. The contact ends of the electrical insertion tubes/electrical insertion pins are immersed in the liquid arc extinguishing medium, but a part of a negative pressure space is retained inside the bellows, to avoid leakage due to the large change of internal pressure caused by the movement of the movable contact head and the temperature change. The motion force of the movable contact head sleeve 101 can be obtained from inside as well as from outside, directly or through levers or other structures provided by manpower, spring force, pneumatic, hydraulic and electromagnetic devices.

Figure 3:
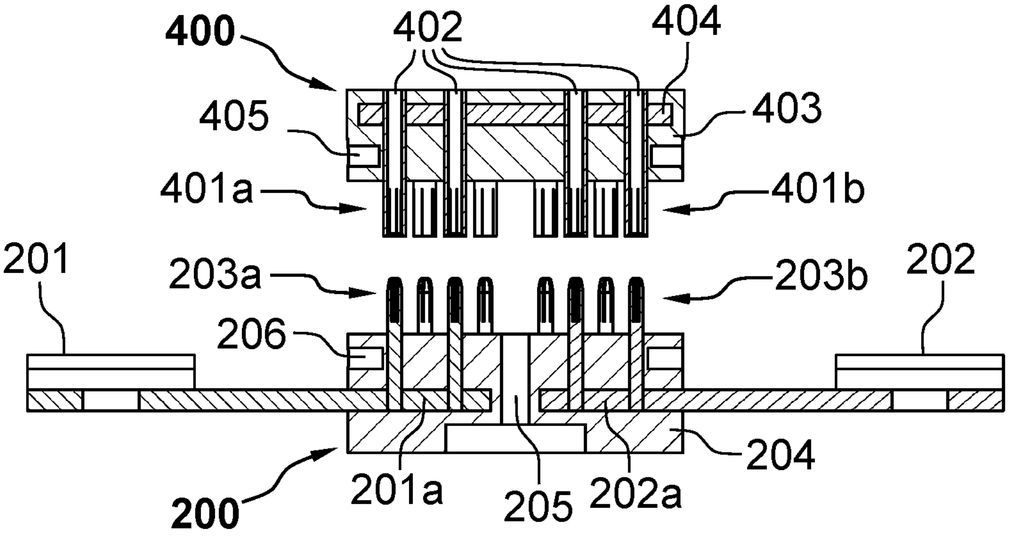
FIG. 3 is a cross-sectional view of the central axis of the static contact head 200 and the movable contact head 400 enclosed in the insulators therein in FIG. 1.

FIG. 3 is a sectional view along the central axis of the static contact head 200 and the movable contact head 400, showing the electrical insertion pins 203 are divided into two parts: the array of electrical insertion pins 203*a* and 203*b*, and both parts are not connected to each other. A first connection substrate 201*a* of the static contact head 200 connects to the array of electrical insertion pins 203*a*, and extends to form the first electric terminal 201. The second connection substrate 202*a* connects to the array of electrical insertion pins 203*b* and extends to form the second electric terminal 202. The first and the second connection substrates 201*a*, 202*a* are enclosed in the static contact head insulator 204. A central hole 205 of the static contact head is an installation space for a temperature-pressure-photoelectric sensor assembly (refer to FIG. 5) inside the contactor. The screw hole 206 is used as screw fixing of the static contact head insulator 204 and the first bellow 300. The array of electrical insertion tubes 401 of the movable contact head 400 comprises two parts 401*a* and 401*b*, both connecting the movable contact head connection substrate 404, enclosed in the movable contact head insulator 403, wherein the screw hole 405 of the movable contact head is used as screw fixing of the first bellow 300 and the movable contact head insulator 403.

Figure 4:
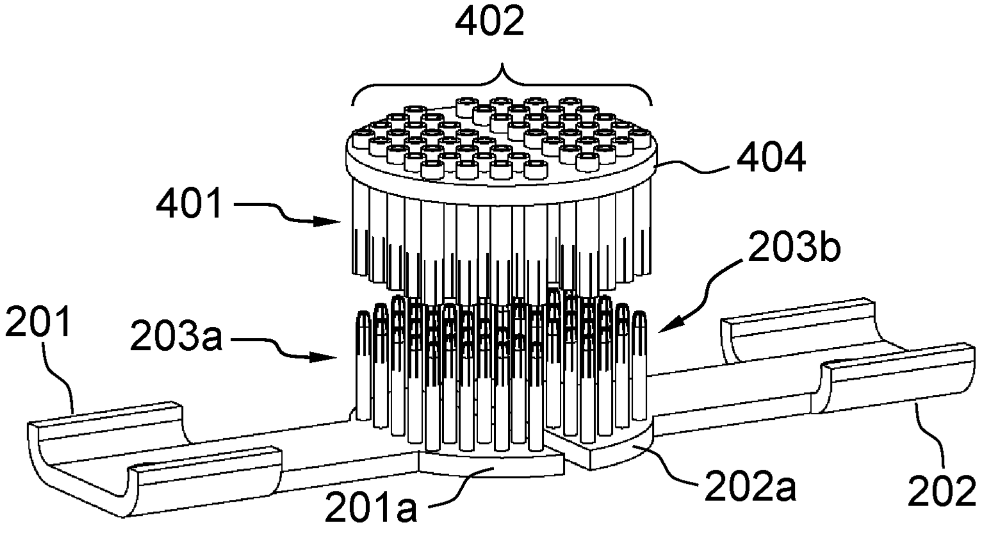
FIG. 4 is a diagram of the electrical structure of the static contact head 200 and the movable contact head 400 with the insulators removed.

FIG. 4 is an electrical structure in the static contact head 200 and the movable contact head 400. The array of electrical insertion tubes 401 and the array of electrical insertion pins 203 are paired one-to-one equidistantly and coaxially to form the arc gaps and an arc gap interface. Unlike the contact points of the contactor in prior art, which may generate electric arc during the process of connect and disconnect, either a lower intensity electric arc may generate at all arc gaps, or the electric arc may move among the different arc gaps and the electric arc duration on the individual electrical insertion tube/electrical insertion pin is short, the damage is therefore reduced. When each of the arc gaps and the arc gap interface are flushed or blown into with the arc extinguishing medium, the arcs even can never be formed from the beginning. The electrical insertion tube is coaxially engaged with the electrical insertion pin, slides laterally to the position and maintains contacted with the radial elasticity of the two, to avoid contacting between the contact points by touching in the prior art in which the contacting is maintained by electromagnetic force thus increase power consumption, and the possible bouncing occurred during the touching contact process and due to electromagnetic interference.

Figure 5:
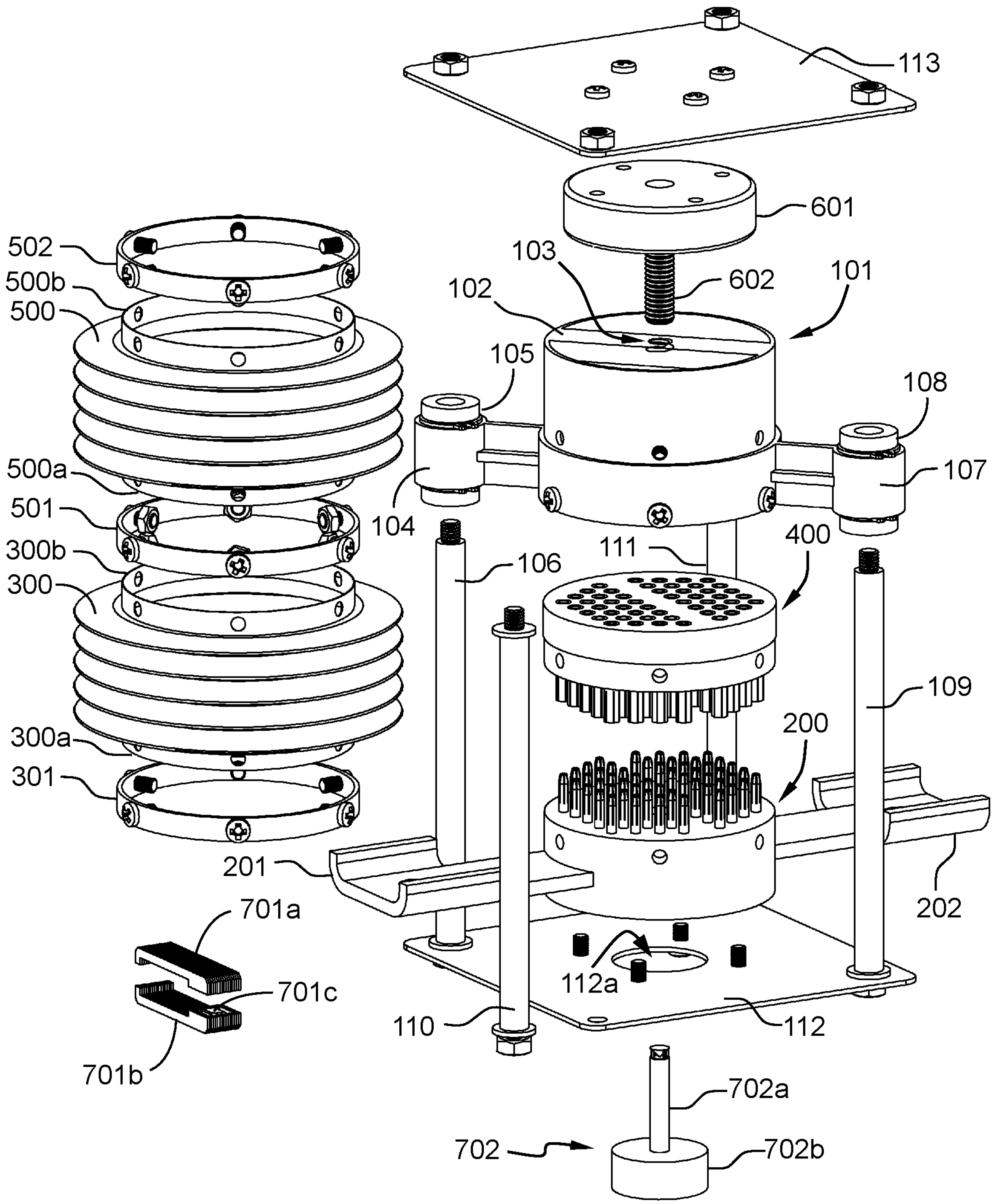
FIG. 5 is an exploded view of one or more embodiments of the contactor.

FIG. 5 is an exploded view showing some embodiments of the contactor of FIG. 1. The contactor comprising: a movable contact head movement frame 100 (refer to FIG. 2), a static contact head 200, a first bellow 300, a movable contact head 400 and a second bellow 500. A geared motor 601 and its leadscrew 602 engages with a thread 103 to drive a beam 102 and its movable contact head sleeve 101, through the first and the second linear bearing 105, 108 along the first and the second bearing track 106, 109, reciprocates between the first and the second fixing plates 112, 113. The same movement can also be driven by an external thread of the movable contact head sleeve 101 or by other means of force application.

The static contact head 200 is fixed at the first fixing plate 112. A first opening 300*a* of the first bellow 300 is tightly (without leaks) arranged with the static contact head 200 and is fixed by a first hoop 301. A second opening 300*b* of the first bellow 300 is tightly arranged with the movable contact head 400 and its exterior is further fixed by the movable contact head sleeve 101. A first opening 500*a* of the second bellow 500 is tightly arranged with the movable contact head sleeve 101 and is fixed by a second hoop 501. A second opening 500$b$ of the second bellow 500 is tightly receivable arranged with the bellow seat (not shown) on the second fixing plate 113 and is further fixed by a third hoop 502. In some embodiments, the geared motor 601 and its leadscrew 602 are accommodated in the second bellow 500, and are fixed at the second fixing plate 113.

The first electric terminal 201 of the static contact head is provided with a main power current sensor 701 adopted with two C-shaped silicon steel laminations 701$a$, 701$b$ combining with each other to form a closed magnetic circuit. A cavity 701$c$ is provided between the laminations with a built-in linear Hall sensor chip for performing open-loop current detection of the current provided by the power supply to the load. Horizontal arms of the silicon steel laminations 701$a$, 701$b$ can also be respectively wound with coils and be connected in series to form a closed-loop current detection device with the Hall sensor and its circuit. Rogowski coil can also be used for performing current detection.

A temperature-pressure-photoelectric sensor assembly 702 is provided in the central hole 112$a$ of the first fixing plate 112 and the central hole 205 (FIG. 3) of the static contact head 200. A detection tube 702$a$ of the sensor assembly goes deeply into the first bellow to measure a temperature of the arc gap interface of the array of electrical insertion tubes/electrical insertion pins through a thermocouple, and to detect dynamic and static electric arc light and pressure changes inside the contactor, and the pressure and photoelectric sensors (not shown) can be located in the sensor base 702$b$.

Figure 6:
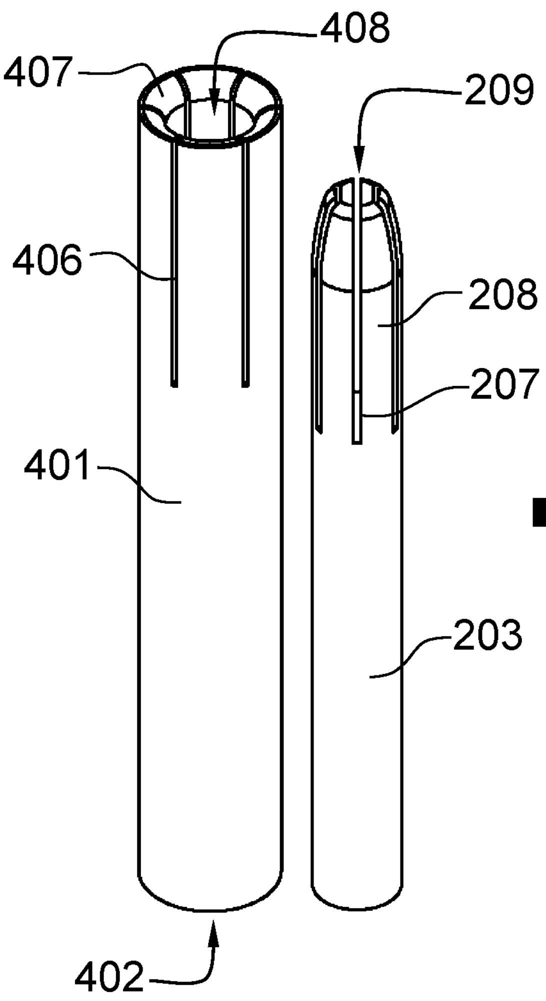
FIG. 6 is a structural diagram of contact units of the electrical insertion tube and the electrical insertion pin.
Figure 7:
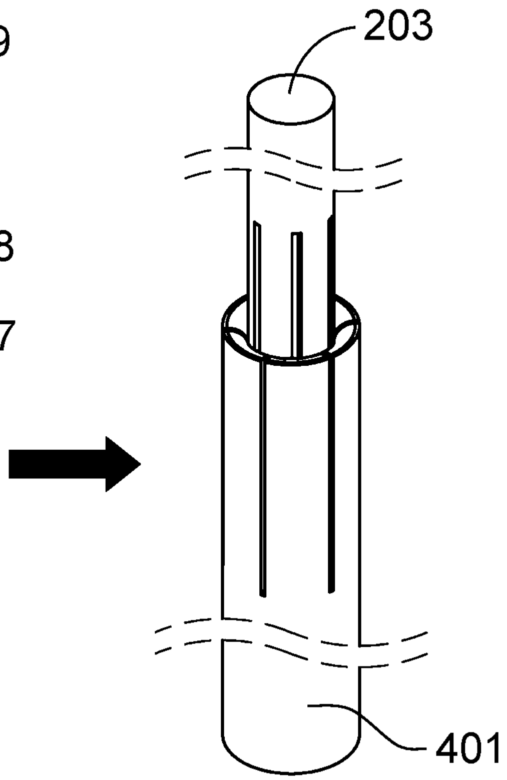
FIG. 7 is a schematic diagram of the electrical insertion tube being orthogonally engaged with the electrical insertion pin.
Figure 8:
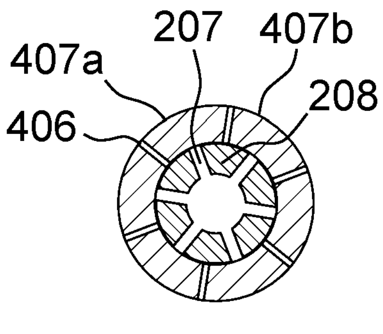
FIG. 8 is a cross-sectional view showing the tile-shaped tip end of the electrical insertion tube being orthogonally engaged with the finger-shaped tip end of the electrical insertion pin.
Figure 9:
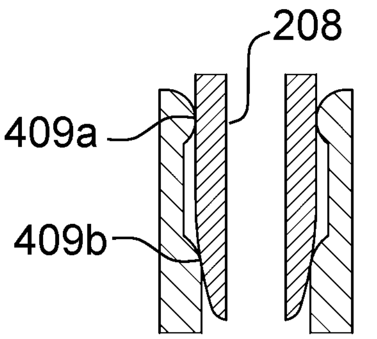
FIG. 9 is a sectional view along the center line showing the tile-shaped tip end of the electrical insertion tube being orthogonally engaged with the finger-shaped tip end of the electrical insertion pin.

FIGS. 6 to 9 show the structures and contact methods of the contact units of the electrical insertion tube and the electrical insertion pin. FIG. 6 shows the electrical insertion tube 401 communicates with the tube opening 408 via the tube opening 402. The contact end is provided with 6 equally divided slitted cuts 406 and tile-shaped tip ends 407. The slitted cuts are almost closed so that the arc extinguishing medium basically enters and exits from the tube opening 408, concentrates at the arc gap to improve the arc extinguishing effect. The electrical insertion pin 203 is a solid conductor and its contact end provided with 6 equally divided wide notches 207 and finger-shaped tip ends 208. There is a shallow hole at the center to improve the flow of the arc extinguishing medium and its arc extinguishing effect. FIG. 7 shows the electrical insertion tube 401 being orthogonally engaged with the electrical insertion pin 203 to a certain depth. FIG. 8 is a cross-sectional view of the electrical insertion tube engaged with the electrical insertion pin showing one finger-shaped tip end 208 in contact with two tile-shaped tip ends 407$a$, 407$b$, and one tile-shaped tip end is also in contact with two finger-shaped tip ends. FIG. 9 is a sectional view along the center line of the electrical insertion tube engaged with the electrical insertion pin, showing one finger-shaped tip end 208 of the electrical insertion tube being in contact with the inner deep and shallow narrow sections 409$a$ and 409$b$ inside the tube opening 408.

When the array of electrical insertion tubes is engaged with the array of electrical insertion pins, all of the cuts of the contact units of the electrical insertion tubes and notches of the contact units of the electrical insertion pins become orthogonal with each other. That is, the cuts are in the middle of two adjacent notches, so that a tile-shaped tip end of an electrical insertion tube contacts with the two adjacent finger-shaped tip ends. When the number of the equally divided cuts of the electrical insertion tube and the equally divided notches of the electrical insertion pin is both N, at least about 2*N contact points are formed. If the finger-shaped tip end of the electrical insertion pin contacts with the deep and the shallow narrow sections of the electrical insertion tube, 4N contact points are obtained. When the number of the pairs of electrical insertion tube/electrical insertion pin is P, 4*N*P contact points are obtained. Therefore, there are two contact point interfaces (breaks) in series between the first electric terminal 201 and the second electric terminal 202, and there are 2*N*P parallel contact points in one interface. Contact resistance of one contact point is $R_c$, then an internal contact resistance of the contactor between the first and the second electric terminals 201 and 202 is $R_c$/N*P (excluding the resistance of the electrical insertion tube, electrical insertion pin and connection substrate) which reduces contact point power consumption and increases its power density, and slow down aging of contact points. The aging further leads to an irreversible increase in contact resistance, which can especially be accelerated by moisture, dust, oxygen, etc., and eventually a failure occurs.

Figure 10:
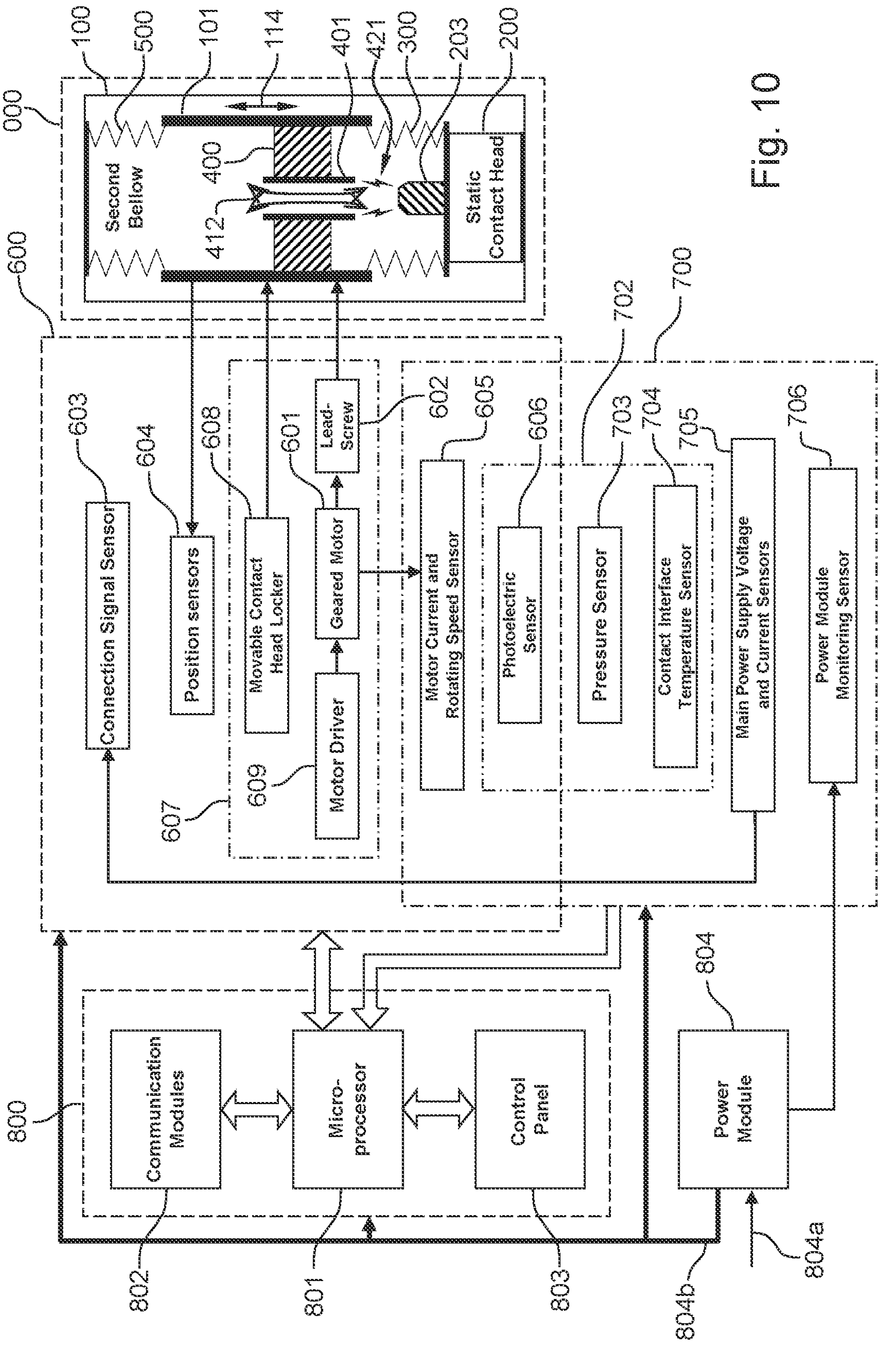
FIG. 10 is a block diagram of the controller and a schematic diagram showing the contactor of some embodiments and their inter-relationship.

FIG. 10 is a block diagram of the controller and a schematic diagram of the contactor. The controller comprising: a microprocessor, a communication module, sensors, an actuating device and a power module, respectively configured as: a microprocessor module 800, a motion control system, and a contactor monitoring and warning system. The microprocessor module 800 comprising: a microprocessor 801, a communication module 802 and a control panel 803. The communication module 802 comprises a wired module and a wireless module. The wired module communicates through serial, cable network, optical fiber communication and etc., while the wireless module communicates through mobile wireless platforms (e.g. low orbit satellite network, drones, infrared, laser, etc.) and distributed platforms (e.g. WiFi, mobile network, 5G+, etc.). The control panel 803 is an external terminal embedded in the device housing (not shown) of the contactor. An instrumental contactor is provided by manual keys-inputting of ON/OFF instructions, functions and parameters setting of the contactor and displaying data and status from the contactor. The microprocessor 801 communicates with the remote terminal through the communication module 802 and communicates with the control panel 803 through the inputs/outputs or the ports of the microprocessor chip. Both communication methods can cover communications of all distances. The power module 804 performs voltage conversion on the power supply 804$a$, and provides power to various parts of the contactor through the power output 804$b$. The power module further comprises a rechargeable battery to provide backup power when the power supply 804$a$ is off.

The microprocessor 801 receives external and remote terminal instructions and data, executes the instructions and parameters setting, monitors the data obtained from the contactor sensors and sends data and alerts to the external and remote terminal, and receives the ON/OFF instructions of the contactor to execute the turning ON and OFF of the contactor with the motion control system. The microprocessor 801 can further implements the ON and OFF of the contactor through an automatic control method, including: a time control method by generating a timed schedule to execute the ON and OFF of the contactor through a microprocessor 801 chip timer and a counter; a parameter trigger method in which the contactor sensor data exceeds the set value or range to trigger ON or OFF of the contactor, for example, when the main (supply) power current or voltage exceeds or falls below the internally set parameters of the microprocessor, it will automatically shut down featuring as a circuit breaker.

The motion control system comprises a microprocessor 801, sensors and an actuating device assembly 600, configured as a digital closed-loop servo control system to perform motion control for the movable contact head sleeve 101 and its movable contact head 400 as well as the process of the engaging and disengaging of the electrical insertion tube and the electrical insertion pin. The sensors comprises: a connection signal sensor 603, position sensors 604, a motor current and rotating speed sensor 605 and a photoelectric sensor 606. The connection signal sensor 603 provides a signal when the electrical insertion tube is in contact with the electrical insertion pin. The position sensors 604 comprises a first position switch and a second position switch, respectively providing the position of the electrical insertion tube when the contactor is turned off, that is, the first position signal (1), and the position of the electrical insertion tube when the contactor is turned on, that is, the fourth position signal 4) (refer to FIGS. 11, 12). The motor current and rotating speed sensor 605 detects motor armature current and determines the movement distance and speed of the movable contact head through the number and interval of pulses generated by the rotation of the motor. The number of pulses can be converted into the distance of the electrical insertion tube relative to the first and the second position switches, and thus determining the electric arc critical position, that is, the second position of the electrical insertion tube (2) (refer to FIGS. 11, 12). The electric arc critical position is concluded based on the theory and experiments, that is, the movable contact head is considered not to generate electric arc outside this position relative to the static contact head. When the two are within this position, the movement speed of the movable contact head will be significantly increased, thereby increasing the flow rate of the arc extinguishing medium and enhancing the arc extinguishing efficiency, or it will be adjusted at an increasing rate in order to effectively extinguish the electric arc with a balanced burden on the motor. It should be noted that an electric arc is not necessarily generated within the electric arc critical position, and that an electric arc may also be generated outside this position. Therefore, relative to the electric arc critical position, the electric arc signal will be preferably used as the signal to trigger the change of movement speed of the movable contact head. When no electric arc is generated, the electric arc critical position signal can be used. The photoelectric sensor 606 detects the electric arc at the contact interface as the control signal for the movement of the movable contact head. An increase in the electric arc signal indicates a change in the contact interface, such as contamination from outside, caused by an internal leakage. The actuating device 607 comprising: a movable contact head locker 608 to lock the movable contact head sleeve 101 when the contactor is turned on and off to prevent the movable contact head from disengagement, displacement and mis-operation; and the actuating device 607 also comprising: a motor driver 609, a geared motor 601 and a leadscrew 602. The geared motor and its leadscrew are not only limited to be provided inside but also outside of the contactor, as long as they can drive the movement of the movable contact head sleeve. The built-in geared motor and its leadscrew in some embodiments are only to utilize the internal space of the second bellow and reduce electromagnetic interference (EMI). The disadvantage is that metal debris, particles of lubricating oil or harmful chemical substances may be generated to destroy the internal clean space.

The contactor monitoring and warning system comprising: the microprocessor module 800 and a sensor assembly 700. The sensor assembly comprising: a motor current and rotating speed sensor 605 (shared with the motion control system), a temperature-pressure-photoelectric sensor assembly 702, a main power voltage and current sensors 705 (comprising the current sensor 701, not shown) and the power module monitoring sensor 706. The current and rotating speed provided by the motor current and rotating speed sensor 605 can be used to calculate the ratio of the rotating speed to the motor current. A increase in this ratio means an increase in the resistance to the movement of the movable contact head and a change in shape or damage to the contact tip ends of the electrical insertion tube/electrical insertion pin. The temperature-pressure-photoelectric sensor assembly 702 detects the temperature, pressure and electric arc light of the contact interface or the arc gap interface of the electrical insertion tube/electrical insertion pin by the sensor assembly detection tube 702*a* (refer to FIG. 5) located in the first bellow 300, comprising: a photoelectric sensor 606 (shared with the motion control system), a pressure sensor 703 and a contact interface temperature sensor 704. An increase in temperature of the contact interface (excluding the influence of ambient temperature) implies damage of the contact points which leads to an increase in resistance to the contact points. The degree of damage is co-related to the temperature. The change of electric arc light also indicates that an adverse change occurs at the contact points. Occurrence of electric arc light in a on-state of the contactor indicates that the problem is serious. Pressure change indicates that an internal leakage of the contactor occurs. The leakage will cause irreversible change to the contact points such as being stained and oxidized, etc., but the change may be slow. The changes of internal temperature, pressure and arc light inside the contactor and their rate of change are collected by the remote terminal, so that different levels of warnings are issued based on a failure data model to indicate the maintenance or replacement of the contactor and its schedule. The temperature, pressure and electric arc light change greatly in a short period of time, the internal program of the microprocessor can identify and determine and then send an emergency alert to the control panel and the remote terminal requesting an emergency treatment. Benefited from the low cost, high value of the data, small size and low demand for precision of the temperature, pressure and photoelectric sensors, they are the ideal sensing components for the contactor of the present disclosure. The main power supply voltage and current sensor 705 measures the voltage and current of the power supply flowing through the contactor to the load which is used for system control, management, and commercial settlement. The changes of voltage and current signals are also used as monitoring signals to trigger the automatic turning ON or OFF of the contactor, such as the circuit breakers. When the current change exceeds the internal setting parameters of the contactor, the contactor is turned off. When the main power supply voltage exceeds the internal setting parameter range, the contactor is automatically turned off, and can be set to be automatically turned on or kept off when the voltage returns to the normal range. The specific implementation is depending on the microprocessor program and its internal setting parameters; the voltage and current data may further become an original signal of the contact signal sensor 603. Once a main power supply cut-off is detected, the main power supply failure emergency procedure will be initiated. The contactor will remain on or off according to the internal settings, and an alert will be sent to the external and remote terminals. The power module monitoring sensor 706 monitors the power supply 804*a*, the power output 804*b* of the power module 804, and the voltage and its changes of the rechargeable battery (not shown). Once the power supply 804*a* of the controller is cut-off, the rechargeable battery will be enabled and the controller power supply failure emergency procedure will be initiated, and particularly, a rechargeable battery or super capacitor voltage warning will be sent out to avoid the battery power exhaustion. If the power supply of the controller is connected to the main power supply, the main power supply failure emergency procedure will also be initiated. With the addition of more sensors and actuating devices and the optimization and upgrade of the microprocessor program, the contactor of the present disclosure will provide more data information, safer operation, simpler structure and longer service lifespan.

FIG. 10 further shows a schematic diagram of the contactor embodiment 000. The contactor 000 comprising: a movable contact head movement frame 100, a static contact head 200, a first bellow 300, a movable contact head 400 and a second bellow 500. The movable contact head movement frame 100 in which the movable contact head sleeve 101 is engaged with the first bellow 300, the movable contact head 400 and the second bellow 500. Under the drive of the leadscrew 602, the movable contact head 400 and its electrical insertion tube 401 are driven to perform a reciprocal movement 114, the electrical insertion tube 401 is receivably engaged with and disengaged from the electrical insertion pin 203. Synchronously, the two bellows 300, 500 alternately extends and retracts. The arc extinguishing medium 412 performs synchronous arc extinguishing at the electric arc 421 through the electrical insertion tube 401. When a signal from the position sensors 604 occurs, the contactor is turned on or off, and the movable contact head sleeve 101 is locked by the movable contact head locker 608.

Figure 11:
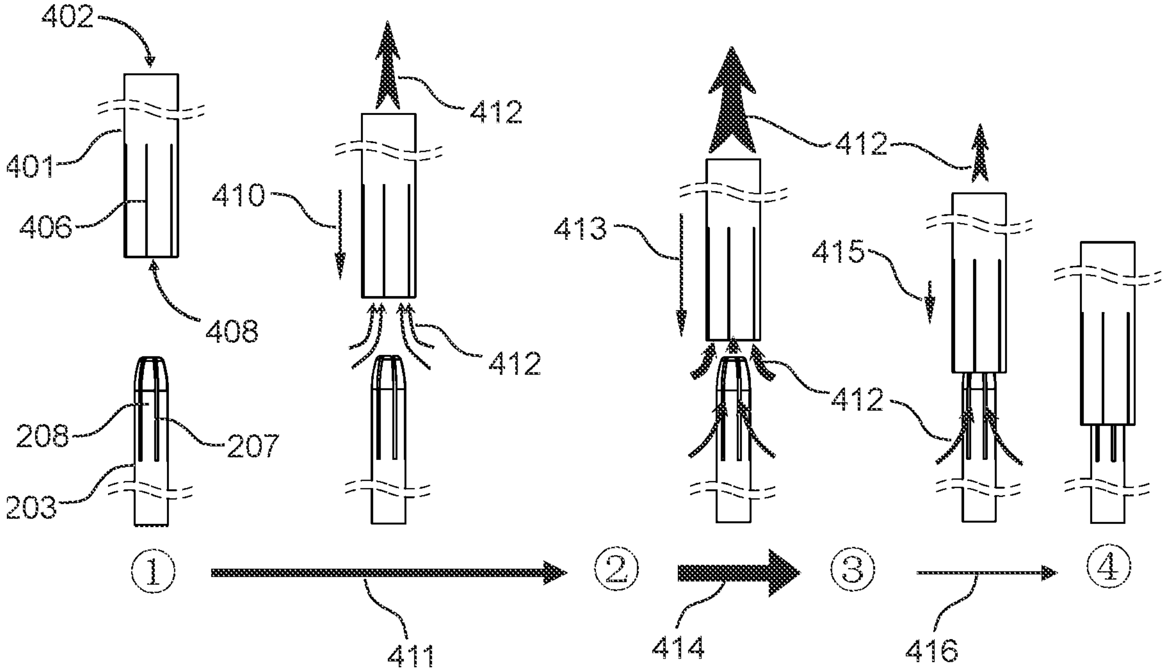
FIG. 11 shows the electrical insertion tube being engaged with the electrical insertion pin and the movement of the arc extinguishing medium and its arc extinguishing effect under motion control.
Figure 12:
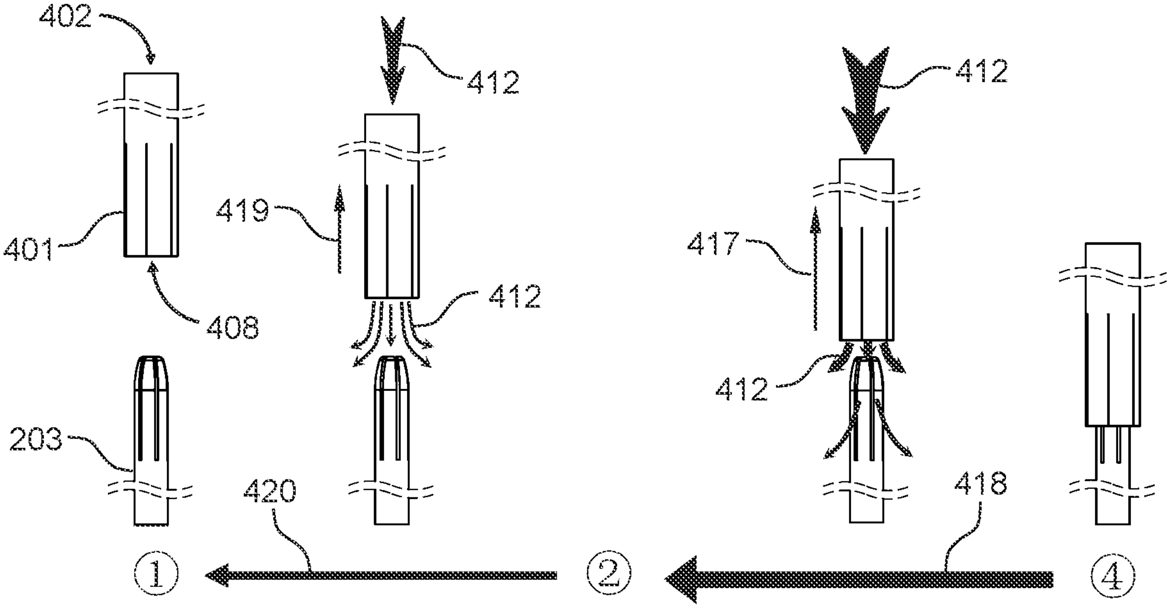
FIG. 12 shows the electrical insertion tube being disengaged from the electrical insertion pin and the movement of the arc extinguishing medium and its arc extinguishing effect under motion control.

FIGS. 11 to 12 respectively show the methods, processes and differences of the electric insertion tube engaged with and disengaging from the electric insertion pin and its arc extinguishing medium to play a synchronous arc extinguishing under motion control (refer to FIG. 10). In FIG. 11, the electrical insertion tube 401 starts from the first position ① where the contactor is turned off, that is, the first position switch signal changes. The electrical insertion tube starts a first positive stroke 411 at a rated second speed 410, the arc extinguishing medium 412 rushes directly into the arc gap and enters the tube through the tube opening 408, and exits from the tube opening 402. When the electric insertion tube reaches the second position ②, an electric arc or the electric arc critical position signal occurs, the electrical insertion tube moves at a high speed towards the electrical insertion pin at a first speed 413 higher than the second speed or at an incremental speed (the average value is equivalent to the first speed) to implement the second positive stroke 414 and the arc extinguishing medium 412 directly rushes into the electric arc (not shown) at high speed. The closer the electric insertion tube to the electrical insertion pin, the smaller the arc gap and the higher the flow rate of the arc extinguishing medium. When the first speed is incremental, the flow rate, fluid force and arc extinguishing effect of the arc extinguishing medium are stronger, thereby to effectively and synchronously suppress the electric arc intensified by the approaching of the electrical insertion tube to the electrical insertion pin. When the electrical insertion tube reaches the third position ③ and contacts the electrical insertion pin, the connection signal occurs (refer to FIG. 10). The electrical insertion tube starts a third positive stroke 416 at a third speed 415 lower than the second speed. The inner wall of the tile-shaped tip ends of the electrical insertion tube slides tangentially against the outer wall of the finger-shaped tip ends of the electrical insertion pin. The arc extinguishing medium with a slower flow speed continues to cool down the contact ends of the electrical insertion tube/contact ends of the electrical insertion pin until they reach the fourth position ④ when the second position switch signal occurs. The finger-shaped tip ends of the electrical insertion pin contact with the two inner narrow sections of the electrical insertion tube, the turning on of the contactor is completed. In the FIG. 12, the electrical insertion tube starts the first reverse stroke 418 at a reverse first speed 417 from the turning-on position of the contactor, that is, the fourth position ④, and disengages from the electrical insertion pin at a high speed or a decreasing speed (the average value is equivalent to the first speed). The arc extinguishing medium enters the tube opening 402 and is discharged at a high speed through the tube opening 408 and to the arc gap to effectively and synchronously suppress the electric arc. Until it reaches the second point ②, the electric arc disappears or the electric arc critical position signal occurs. The electrical insertion tube starts the second reverse stroke 420 at a rated reverse second rate 419 until it reaches the first position ① when the first position switch signal occurs. The turning off of the contactor is completed and the movable contact head is locked.

Figure 13:
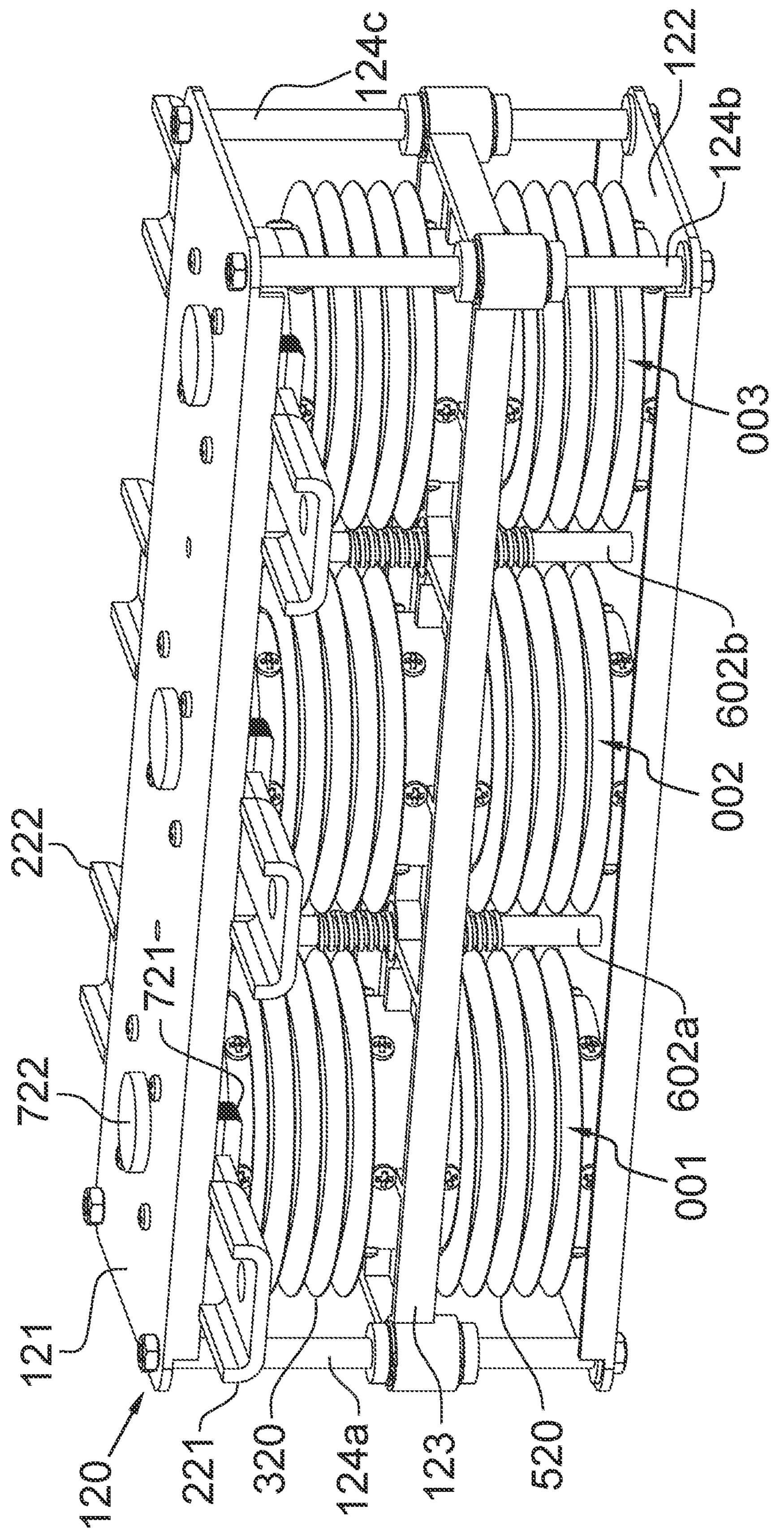
FIG. 13 are some embodiments of a three-way parallel contactor having three identical contactors.

FIG. 13 shows a three-way contactor of some embodiments having three identical contactors 001, 002 and 003, and only the contactor 001 is described here. The contactor 001 comprising: electric terminals 221 and 222, a first and a second bellows 320, 520, a main power current sensor 721, a temperature-pressure-photoelectric sensor assembly 722, and a movable contact head movement frame 120. The movable contact head movement frame 120 comprising: a first fixing plate 121 and a second fixing plate 122, four bearing tracks 124*a*, 124*b*, 124*c* and a fourth bearing track (not shown) and their linear bearings and bearing bases, and a movable contact head movement platform 123. The movable contact head movement platform 123 is attached to the bearing base, and is driven by the equal speed leadscrews 602*a* and 602*b* to perform up and down movements to implement the synchronous movement of the movable contact heads of the three-way contactor, and the turning on and off of the three contactors in parallel. Contactors with different structures and in different quantities can also be arranged in a movement frame to perform the synchronous movement and switch operation under the drive of a movable contact movement platform. It can also be driven by an independent similar movable contact head sleeve 101 (FIGS. 2, 5 and 10) and its motor and leadscrew (FIG. 2, 5) to perform synchronous logic switch operation or sequential process control switch operation.

Figure 14:
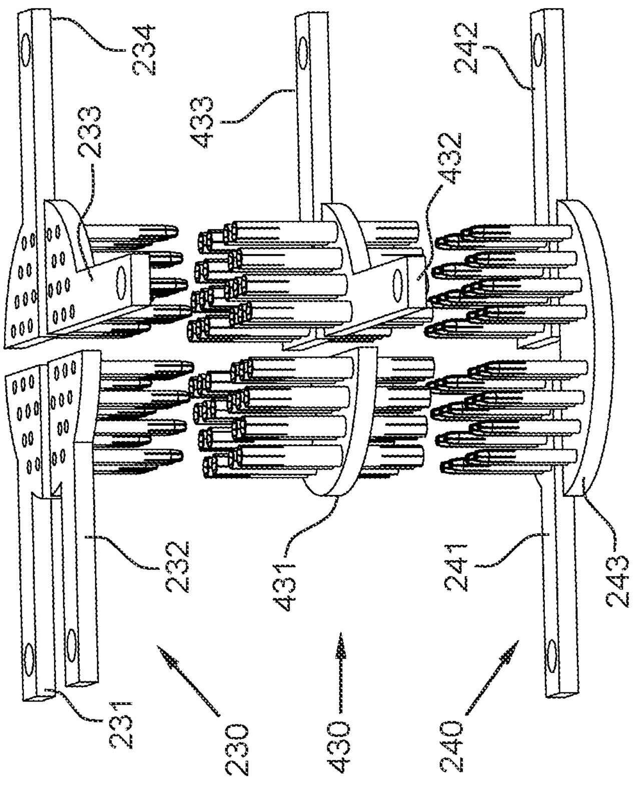
FIG. 14 is an electrical structure of the movable contact head with contact units of dual contact ends and two static contact heads of some embodied contactors without insulators.

FIG. 14 shows the electrical structure of some embodiments of a contactor with two static contact heads comprising: a first static contact head 230, a movable contact head 430 with dual contact ends and a second static contact head 240. The first static contact head 230 comprising: four connection substrates in ¼ circular shape and their arrays of electrical insertion pins and four electric terminals 231, 232, 233 and 234. The movable contact head 430 with dual contact ends comprises three connection substrates and their dual contact ends of the arrays of electrical insertion tubes, wherein they are: a semi-circular connection substrate 431 without electric terminals and two connection substrates in ¼ circular shape having electric terminals 432 and 433 respectively. The second static contact head 240 comprises two connection substrates in ¼ circular shape and their arrays of electrical insertion pins and electric terminals 241, 242, and a semi-circular connection substrate 243 without electric terminals and its array of electrical insertion pins. In the contactor of the two static contact heads, the movable contact head moves at three functional positions: contacting the first static contact head, contacting the second static contact head and neutral (no contact). When the movable contact head 430 contacts the first static contact head 230, the terminals 231, 232 of the static contact head are electrically connected through the semi-circular connection substrate 431 of the movable contact head and its array of electrical insertion tubes, and the electric terminals 233, 234 of the first static contact head 230 are electrically connected to the electric terminals 432 and 433 of the movable contact head respectively. When the movable contact head 430 contacts the second static contact head 240, the electric terminal 241 of the second static contact head 240 via the array of electrical insertion tubes of the movable contact head 430 and its semi-circular connection substrate 431, and then via the semi-circular connection substrate 243 of the second static contact head 240 and its array of electrical insertion pins, and is finally electrically connected to the electric terminal 432 of the movable contact head 430 to form a three-breaks electrical connections, and the electric terminal 433 of the movable contact head 430 is electrically connected to the electric terminal 242 of the second static contact head 240. The number of connection substrates of the electrical structure of the static contact head and the movable contact head can be more than one, and may also be provided with electric terminals, especially in the two static contact heads of the contactor. A variety of combinations can be provided to form a complex logic contactor or a multiplexed power switch. A more complex power switch system can also be constructed by combining multiple contactors described above (refer to FIG. 13).

Figure 15:
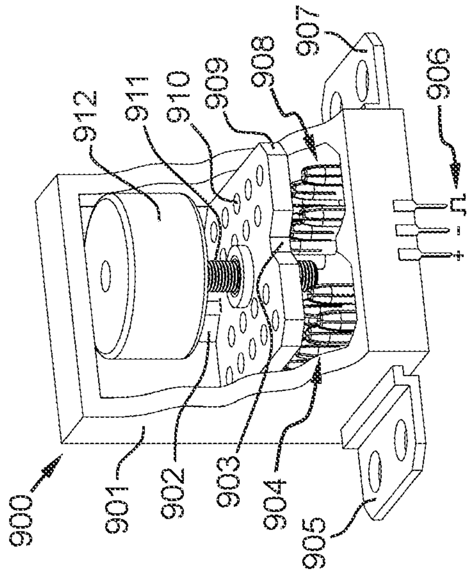
FIG. 15 is an internal open structure diagram showing some embodiments of a piston type movable contact head contactor.

FIG. 15 is an internal open structure diagram of the contactor of some embodiments: a piston type movable contact head contactor. The piston type movable contact head contactor 900 comprising: a cylinder housing 901 and its longitudinal slide track 902, a movable contact head slide slot 903, a first array of electrical insertion pins 904 and a first electric terminal 905 connected thereto, a power source and a single input control terminal 906, a second electric terminal 907 and a second array of electrical insertion pins 908 connected thereto, a piston type movable contact head 909, an array of insertion holes 910 of the movable contact head and a leadscrew 911 and its motor 912, further comprises a controller (not shown) connected to the power source and control input terminal 906 and the motor 912. The motor 912 drives the piston type movable contact head 909 with the leadscrew 911, the array of insertion holes 910 of the movable contact head 909 are engaged with or disengaged from the array of electrical insertion pins 904 and 908, and the first and the second electric terminals 905, 907 are connected or disconnected, that is, the turning on or off of the contactor. When the contactor is turned on or off, the position of the movable contact head 909 is determined by a switched position signal. It is also possible to set a stroke position limit rigid structure to limit the movement of the movable contact head. Two end points of the stroke are the ON and OFF positions of the contactor and can be determined based on the logical relationship of zero motor rotation speed, non-zero armature current and the direction of rotation of the motor. The controller of the piston type movable contact head contactor, depending on its size, specification and application environment, can have a microprocessor or a simplified circuit having only analog, logic and motor drive chips or a single chip IC integrating the three to control the turning On and OFF of the contactor.

Figure 16:
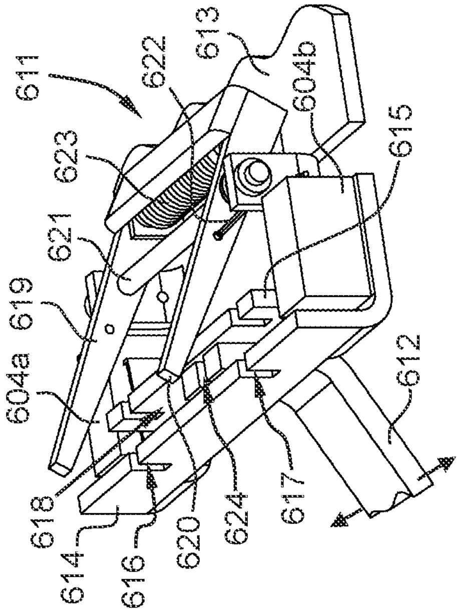
FIG. 16 is a movable contact head locker composite device.

FIG. 16 is a movable contact head locker composite device 610, it comprises a fixture 611 and a movable arm 612. The fixture 611 comprising: a bottom plate 613, two folded plates 614, 615 which are parallel to each other and are perpendicular to the bottom plate formed by stamping, slots 616, 617 which pass through the two folded plates, a channel 618 which penetrates between the two folder plates, with the front and back of the channel being blocked by the bottom plate 613. The movable contact head lock railings 619, 620 is hinged and connected with a shaft 621 and is rotatable, and is slotted into the slots 616, 617 respectively under the spring force of a spring 622, and when an electromagnetic coil 623 is electrically connected, the electromagnetic force overcomes the spring force and lifts up to disengage from the slots 616, 617. The movable arm 612 inserts into the channel 618 and is movable back and forth in channel 618, but is blocked by the front and back of the bottom plate 613. There is a slot 624 at a part of the movable arm 612. The slot 624 is aligned with slot 616 or slot 617 when the movable arm 612 is blocked by the bottom plates at the front and back position. When the electromagnetic coil 623 is powered off, the movable contact head is locked therein the railing 619 or 620 is slotted into the slot 624 and the slot 616 or slot 617. In the contactor, the movable arm 612 is fixed with the movable contact head sleeve 101 (refer to FIG. 5). The bottom plate 613 is fixed at the non-movable parts of the movable contact head movement frame 100 (refer to FIGS. 1, 5) so that the movement stroke of the movable contact head sleeve 101 is limited. The end position of the stroke of the movable contact head sleeve is the position of the movable contact head when the contactor is turned on and off, that is, the locked position. At the end position of the stroke of the movable contact head sleeve 101, the rotating speed of the geared motor is zero, its armature current increases significantly. These signals can be converted into signals for the controls of the contactor. The electromagnetic coil 623 and the motor driving current are turned off by the microprocessor or logic IC, the movable contact head sleeve is locked, and thereby completing the ON or OFF of the contactor. FIG. 16 also shows the first and second position switches 604*a*, 604*b* which provide position signals of the movable contact head sleeve for ON and OFF of the contactor.

The claims, the embodiments, the drawings, the technical solutions and their descriptions involved in the present disclosure seek to explain the technical features with the most basic structure and method of the contactor of the present disclosure, so as to facilitate the understanding of relevant institutions and their personnel. On the basis of all the above, it is not difficult for a skilled person in the art to conceive, design, expand and realize other structures, methods and effects to solve the problems raised or not raised in this description, and those structures and methods fall into the scope of protection of the present disclosure.

The invention claimed is:

1. A contactor, comprising:

an enclosed space containing a liquid or a gas arc extinguishing medium or a vacuum; and a movable contact head separates the enclosed space into two chambers, wherein at least one of the two chambers is provided with a static contact head, at least one contact unit of the static contact head one to one aligns with at least one contact unit of the movable contact head forming at least one arc gap, the at least one contact unit of the movable contact head is hollow enabling the two chambers to communicate;

wherein the movable contact head reciprocates, the at least one contact unit of the movable contact head is receivably engaged with and disengaged from the at least one contact unit of the static contact head, the two chambers are alternately compressed and expanded, wherein the liquid or the gas arc extinguishing medium rushes into the at least one arc gap back and forth through the hollow of the at least one contact unit of the movable contact head, and circulates between the two chambers, providing the contactor and a self-circulating reciprocal synchronous arc extinguishing pump to implement turning ON, OFF of the contactor and synchronous arc extinguishing thereof.

2. The contactor according to claim 1, the two chambers comprising a first bellow and a second bellow, a first opening of the first bellow is arranged at the static contact head, a second opening of the first bellow is arranged at the movable contact head, the movable contact head is also arranged at a first opening of the second bellow, and a second opening of the second bellow is fixed and sealed, or is arranged at a second static contact head; wherein the movable contact head performs reciprocal movement under an acting force, the first bellow and the second bellow alternately extend and retract, the liquid or the gas arc extinguishing medium circulates between the first bellow and the second bellow, to provide a double bellows arc extinguishing pump contactor.

3. The contactor according to claim 1, wherein the static contact head comprises: at least one connection substrate enclosed in a static contact head insulator, or further extended outwardly to form at least one electric terminal, and one or an array of contact units connected with the at least one connection substrate, and with contact ends thereof protruding from a surface of the static contact head insulator;

the movable contact head comprises: at least one connection substrate enclosed in a movable contact head insulator, or further extended outwardly to form at least one electric terminal, and one or an array of contact units penetrating through the at least one connection substrate, and with contact ends thereof protruding from a surface of the movable contact head insulator and one-to-one equidistantly paired with the contact ends of the static contact head; or the one or the array of contact units of movable contact head are provided with dual contact ends protruding from both surfaces of the movable contact head insulator.

4. The contactor according to claim 3, wherein the contact ends of the static contact head are divided into multiple contact tip ends, and/or the contact ends of the movable contact head are divided into multiple contact tip ends, or an inner opening of the contact ends of the one or the array of contact units of the movable contact head is provided with a deep and a shallow two-layered narrow sections.

5. The contactor according to claim 3, wherein the one or the array of contact units of the movable contact head are electrical insertion tubes, the one or the array of contact units of the static contact head are electrical insertion pins, or the contact units of the static contact head and the movable contact head are of non-circular structure.

6. The contactor according to claim 4, is provided with a piston-type movable contact head contactor, comprising:

an airtight cylinder-type housing, having an interior filled with the liquid or the gas arc extinguishing medium or being configured as vacuum, and an inner wall with longitudinally protruding sliding tracks;

a piston-type movable contact head movably fitting to the inner wall, separates the interior of the airtight cylinder-type housing into the two chambers, comprising the at least one contact unit being opened for the communication of the two chambers; and an actuating device driving the at least one contact units of the movable contact head to engage with and disengage from the at least one contact units of the static contact head, providing the contactor and a cylinder piston type arc extinguishing pump.

7. The contactor according to claim 1, further comprises a controller, comprising: a microprocessor, sensors, an actuating device and a power module providing a motion control system for performing motion control on the movable contact head, and implementing segmented speed controls, and positioning on processes for the at least one contact unit of the movable contact head to engage with and disengage from the at least one contact unit of the static contact head; wherein the power module provides power conversion for powering the controller, or further comprises a rechargeable battery to be activated when a supply of the power module is cut off.

8. The contactor according to claim 7, the motion control comprises means:

turning ON the contactor: the movable contact head moves from an OFF position of the contactor towards the static contact head at a high speed, and moves at a slow speed after the at least one contact unit of the movable contact head contacts the at least one contact unit of the static contact head until a completion of turning ON the contactor; and turning OFF the contactor: the movable contact head at a turning ON position of the contactor, moves reversely at the high speed and stops at a completion of turning OFF the contactor.

9. The contactor according to claim 7, the controller further comprises:

a time control means: setting a timed trigger of the microprocessor to perform timed ON and OFF of the contactor in an interrupt mode; and/or a parameter triggering means: sensor data exceeding a set value or a range to trigger the ON and OFF of the contactor.

10. The contactor according to claim 7, the controller comprises a simplified circuit having an analog logic circuit and a motor drive chip, or a monolithic IC integrating the simplified circuit to implement simple ON/OFF control.

11. The contactor according to claim 1, the contact units of the static contact head and the movable contact head are contacted longitudinally engaged to laterally slide to each other to a completion of contact, and maintained in contact with horizontal elasticity of contact tip ends of the contact units of the static contact head and the movable contact head.

* * * * *